Sept. 1, 1964  E. S. JOLINE  3,146,830

PRIME MOVER MONITORING SYSTEM

Filed Dec. 6, 1962  2 Sheets-Sheet 1

INVENTOR.
EVERETT S. JOLINE
BY
Arthur H. Serrell
ATTORNEY

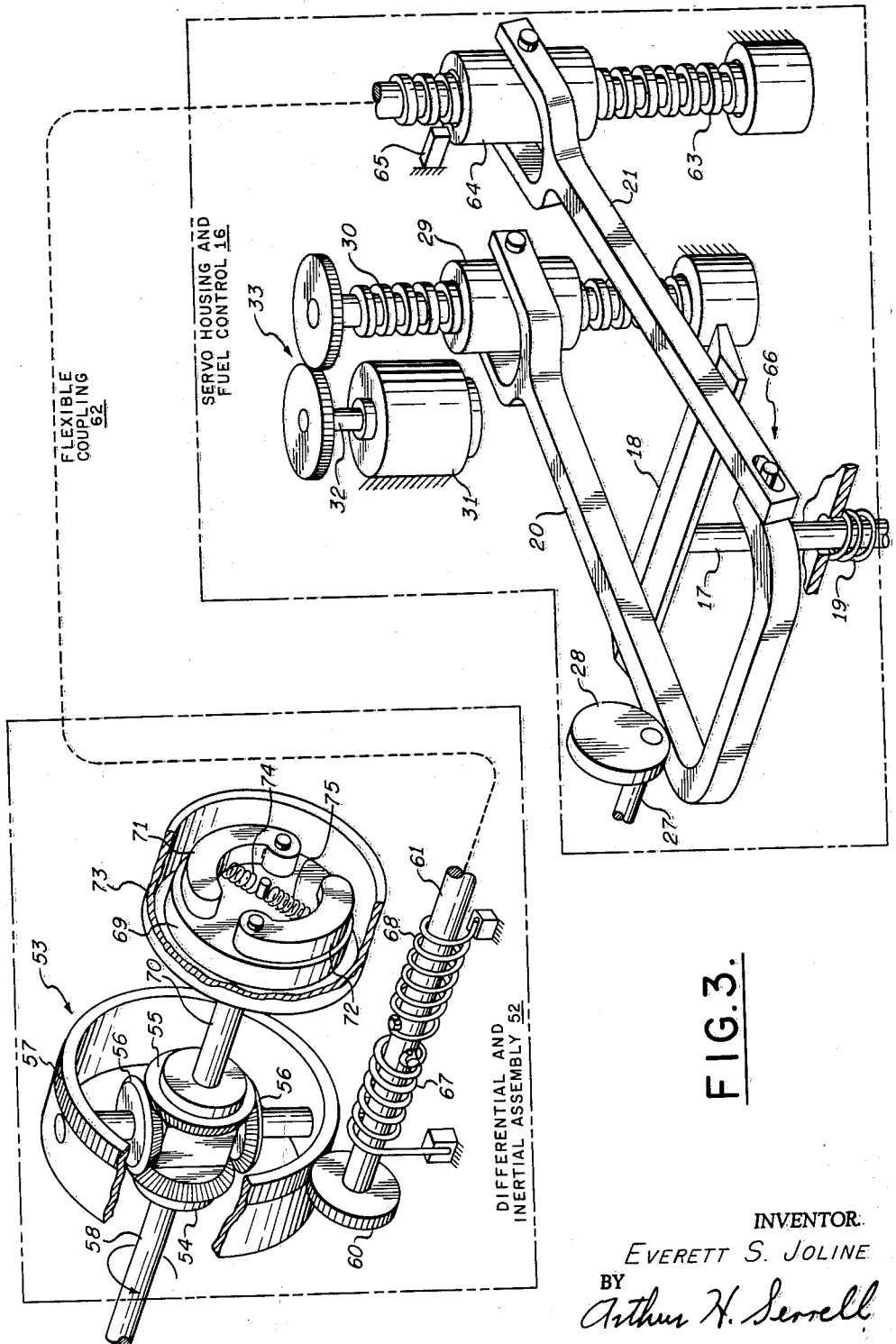

United States Patent Office 3,146,830
Patented Sept. 1, 1964

3,146,830
PRIME MOVER MONITORING SYSTEM
Everett S. Joline, Huntington Station, N.Y., assignor to Sperry Rand Corporation, Great Neck, N.Y., a corporation of Delaware
Filed Dec. 6, 1962, Ser. No. 242,776
8 Claims. (Cl. 170—135.73)

The present invention relates generally to power systems of the character in which a prime mover is connected by an output shaft to a load and the speed of the shaft as well as the safety of the system is monitored by control of the throttle or fuel intake valve of the prime mover. More particularly, the improved system includes means for monitoring the prime mover for failsafe operation of the shaft that also prevents the shaft from overspeeding. Both types of control are effected through an operative connection between the throttle valve of the prime mover and the improved monitoring means.

An object of the invention is to provide a monitoring structure in a system of the class described in which no reference independent of the shaft input from the prime mover is included therein.

One of the features of the invention resides in the provision in the monitoring means of a differential with two inputs and an output whose output is connected to operate the throttle or intake valve of the prime mover through a connection that includes means for normally biasing the output to null.

Another feature of the invention resides in the provision in the monitoring means of a means for overcoming the restraint of the biasing means. This structure includes an inertial member driven through the differential at a speed in accordance with the speed of the shaft having brake drum and centrifugal brake shoe elements that cooperate at a predetermined shaft speed limit to obtain this result.

A further feature of the invention resides in the provision in the monitoring means of a connection to the differential from the shaft providing a failsafe condition input to the inertial member.

Figure 1:
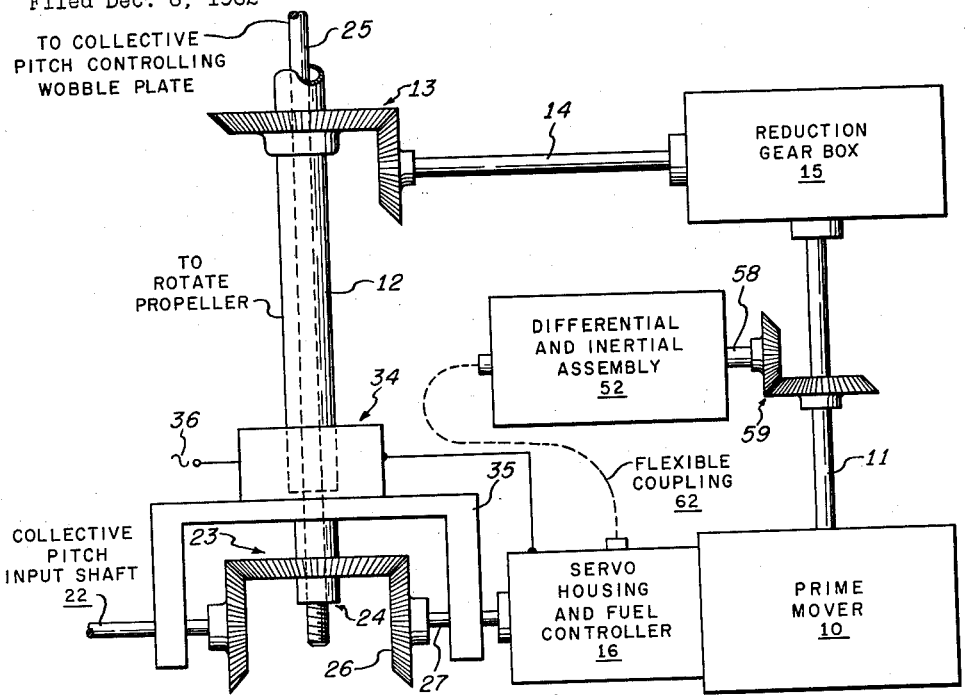
Figure 2:
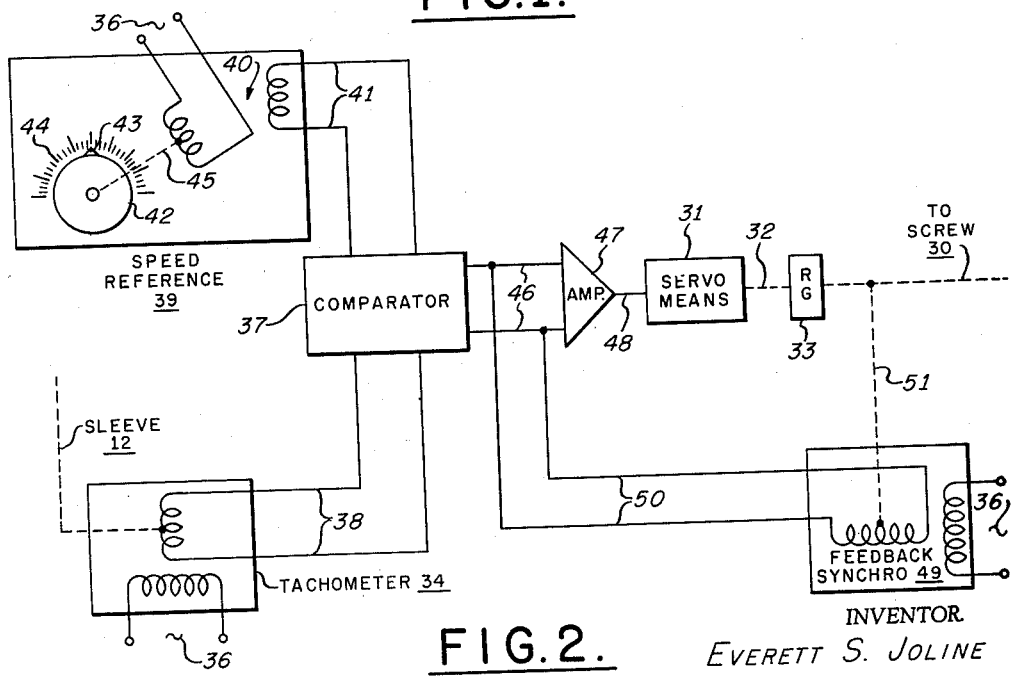

Further objects, features and structural details of the improved monitoring system will be apparent from the following description when read in relation to the accompanying drawings, wherein:

FIG. 1 is a schematic diagram of an embodiment of the invention where the load provided the prime mover is the propeller of a helicopter and the fuel intake valve is also differentially responsive to the outputs of a collective pitch means as well as a servo means, FIG. 2 is a wiring diagram of the electrical components of the system shown in FIG. 1, and FIG. 3 is a detail perspective view of the elements designated as the assembly and controller components of the improved system shown in FIG. 1, including the flexible coupling therebetween.

As shown in FIG. 1, the improved system operates to monitor a suitable prime mover 10 of the type having an output shaft 11. Where the load on the prime mover 10 is the rotating propeller of a helicopter as represented, shaft 11 is operatively connected to the propeller by propeller drive sleeve 12, bevel gearing 13, shaft 14, and reduction gear box 15. The prime mover 10 is an engine of the internal combustion type whose shaft speed is governed by means of a suitable fuel controller or adjustable intake valve. In FIG. 1, the valve of mover 10 is included as a part of the component designated as servo housing and fuel controller 16. This component, in FIG. 3, shows the fuel intake valve of the prime mover 10 as a valve stem 17 having a fulcrum piece 18 fixed to its end. Upward motion of the stem 17 and piece 18 under the influence of a biasing spring 19 opens the valve to admit more fuel to the prime mover and accordingly increase the speed of the shaft 11. Reverse motion of the slide stem 17 against spring 19 through the influence on the fulcrum piece 18 of either a differential lever 20 or monitoring lever 21 results in relative closing of the intake valve to reduce the fuel supplied to the prime mover and the corresponding lowering of the speed of the output shaft 11.

In helicopter control systems of the type shown in U.S. Letters Patent No. 2,479,549, issued August 23, 1949, to Waldemar A. Ayres et al., the collective pitch of the variable pitch propeller is changed by an output means that includes a shaft 22 indicated in FIG. 1 providing a collective pitch input, and bevel gearing 23 with a nut and elevation screw joint 24 for a lift rod 25 that extends through the drive sleeve 12 to connect with the collective pitch controlling wobble plate. As shown in FIGS. 1 and 3, the collective pitch input provided in the improved helicopter system to operate the controller 16 includes bevel gear 26 connected to the gearing 23, shaft 27 and cam 28 that engages the surface of the differential lever 20 to one side of the fulcrum piece 18. One of the differential inputs to the lever 20 is accordingly dependent on the collective pitch of the blades of the propeller as represented by the angular adjustment of the cam 28. The other of the differential inputs to the lever 20 is provided by a screw and nut joint where the nut 29 is pivotally connected to the lubricated end of the lever 20 at the opposite side of the fulcrum piece 18. Rotation of the screw 30 by a servo means 31 through drive shaft 32 and connecting reduction gearing 33 moves the nut 29 along the axis of the screw 30 to either lower the valve stem 17 or permit it to raise depending on the direction of the axial travel of the nut. As represented in FIG. 3, the servo means 31 is an electric motor whose stator is fixedly mounted in the component of the system designated as the servo housing and fuel controller 16.

The output of the servo means 31 in the described monitoring system is dependent on a difference between the actual speed of operation of the propeller and a settable reference speed. As shown in FIG. 2, a tachometer 34 with a rotor driven by the sleeve 12 and a stator fixedly connected to a portion of the frame 35 of the helicopter energized from a suitable source 36 provides an electrical signal that is fed to a comparator 37 by way of leads 38. The output of the tachometer 34 is accordingly dependent on the speed at which the prime mover 10 is driving the propeller load. The other input to the comparator 37 is provided by a speed reference 39 in the form of an electrical synchro 40 whose stator is connected by leads 41 to the comparator. A knob 42 with an index 43 settable by the human pilot with respect to a speed scale 44 is connected by shafting 45 to angularly position the rotor in relation to the stator of the synchro 40. Source 36 is connected to the rotor of the synchro 40 whose output to the comparator 37 depends on the setting of the reference 39. The comparator 37 in the circuit diagram of FIG. 2 matches the signals of tachometer 34 and synchro 40 and provides an output when there is a difference therebetween to operate the servo means 31. The circuit connecting the comparator 37 and means 31 includes leads 46, amplifier 47 and lead 48. The operation of the servo means 31 results in effective movement of the valve stem 17 so that the speed of the prime mover 10 is either increased or decreased as required to either increase or decrease the output of the tachometer 34 to a level such as to match the output of the reference 39. For optimum performance of the servo means 31, a feedback input is provided thereto from a synchro 49 by way of leads 50 to the leads 46. As shown in FIG. 2, the rotor of feedback synchro 49 is connected by shafting 51 to the reduction gearing 33 and the stator is energized by the source 36.

The improved system monitors the prime mover 10 to provide for its failsafe operation as well as prevent the propeller or shaft of the prime mover from overspeeding. The components of the system constituting the monitoring means include an assembly designated as a differential and inertial assembly 52 in FIGS. 1 and 3. As shown in FIG. 3, the differential 53 of the assembly 52 includes an input part or gear 54, an input part or gear 55 connected to the part 54 by planetary gearing 56, and an output part or gear 57. Input gear 54 of the differential is connected to rotate in failsafe condition depending on the speed of the shaft 11 of the prime mover 10. The connecting means shown in FIGS. 1 and 3 includes shaft 58 and bevel gearing 59. In the improved combination, the fuel intake valve of the prime mover 10 is monitored through an operative connection between the lever 21 and the output part or gear 57 of the differential 53. As particularly shown in FIG. 3, the connecting means provided between the noted parts includes gear 68, shaft 61, flexible coupling 62 between the assemblies 52 and 16, a screw and nut fitting in which the screw 63 rotated by coupling 62 moves the nut 64 in a downward direction away from a stop piece 65. In the position of the lever 21 shown in FIG. 3, it is supported out of engagement with the fulcrum piece 18 by the raised nut 64 to which its bifurcated end is pivotally connected. The other end of lever 21 is shown connected to the lever 20 by a pin and slot fitting 66 on the opposite side of the fulcrum piece 18. The output of the differential 53 is biased to null with the nut 64 engaging the stop 65 by resilient means shown as coil springs 67 and 68, one of the ends of which are connected to the shaft 61 and the other of the ends of which are anchored to the assembly 52 to provide the necessary restraint. Operation of the monitoring system requires an output from the differential 53 so that the nut 64 moves the lever 21 to a position engaging the fulcrum piece 18 to operate the fuel intake valve through its stem 17 in a direction that shuts off the supply of fuel to the prime mover 10.

The means included in the improved system for overcoming the restraint of the described biasing means is provided by an inertial member in the form of a flywheel 69 that is connected by shaft 70 to the differential input gear part 55. The inertial component of the system further includes a moving brake element shown as centrifugal brake shoes 71, 72 that are pivoted on the flywheel 69. The brake shoes 71, 72 move in a direction to cooperate with a fixed brake drum 73 at a predetermined speed of the shaft 70 against the restraint of springs 74 and 75. Under normal operating conditions with no output from the differential 53 of the monitoring means, the input gear 55, shaft 70, flywheel 69 and brake shoes 71, 72 rotate in accordance with the speed of rotation of the differential input gear part 54 being driven thereby through the interconnecting planetary gearing 56. Under conditions requiring monitoring action such as where the shaft 11 either exceeds a predetermined speed limit or stops, the system operates automatically to produce an output from the differential 53 to move the lever 21 as heretofore described. Operation under overspeed conditions results from engagement of the brake shoe elements 71, 72 with drum 73 to slow the rotational speed of the inertial member, shaft 70 and input differential part 55 with respect to the shaft 58 and differential input gear 54. Under conditions where the load is suddenly separated from the prime mover and shaft 58 together with differential part 54 stops, the flywheel 69 continues to rotate the shaft 70 and differential input gear 55. In both of the described conditions where there is a difference in the inputs to the differential 53, the differential output gear part 57 turns the shaft 61 against the influence of the provided restraining springs to operate the screw 63 and nut 64 and the monitoring lever 21.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A system for governing the speed of a helicopter propeller with variable pitch blades having output means for controlling the collective pitch of the blades, servo means providing an output depending on the difference between the speed of the propeller and a settable speed reference, and a prime mover operatively connected to the propeller having a fuel intake valve differentially responsive to the outputs of the collective pitch means and the servo means; including means for monitoring the prime mover to provide failsafe operation of the system and prevent the propeller from overspeeding including a differential having an output connected to operate the fuel intake valve and two inputs, resilient means for normally biasing the output of the monitoring differential to null, means connecting one of the inputs of the differential for rotation in failsafe condition depending on the speed of the propeller, and means for overcoming the restraint of the biasing means including an inertial member driven by the other differential input part in accordance with the speed of rotation of the one of the differential inputs having brake drum and centrifugal brake shoe elements cooperating at a predetermined propeller speed limit.

2. A system for governing the speed of a helicopter propeller with variable pitch blades having output means for controlling the collective pitch of the blades, servo means providing an output depending on the difference between the speed of the propeller and a settable speed reference, and a prime mover operatively connected to the propeller having a fuel intake valve differentially responsive to the outputs of the collective pitch means and the servo means; including means for monitoring the prime mover to provide failsafe operation of the system and prevent the propeller from overspeeding including a mechanical differential having an output gear and two input gears, a connection between the output gear and the fuel intake valve with a restraining spring for normally nulling the output of the monitoring differential, means connecting one of the differential input gears for rotation in failsafe condition depending on the speed of the propeller, and means for overcoming the restraint of the spring on the output gear connection of the monitoring means including an inertial member driven by the other differential input gear in accordance with the speed of rotation of the one of the differential gear inputs having brake drum and centrifugal brake shoe elements cooperating at a predetermined propeller speed limit.

3. A system for governing the speed of a helicopter propeller with variable pitch blades having output means for controlling the collective pitch of the blades, servo means providing an output depending on the difference between the speed of the propeller and a settable speed reference, and a prime mover operatively connected to the propeller having a fuel intake valve differentially responsive to the outputs of the collective pitch means and the servo means; including means for monitoring the prime mover to provide failsafe operation of the system and prevent the propeller from overspeeding including a differential having an output connected to operate the fuel intake valve and two inputs, resilient means for normally biasing the output of the monitoring differential to null, means connecting one of the inputs of the differential for rotation in failsafe condition depending on the speed of the propeller, a flywheel and a centrifugal brake shoe element driven by the other differential input part in accordance with the speed of rotation of the one of the differential inputs, and a brake drum element cooperating with the shoe element at a predetermined propeller speed limit to overcome the restraint of the biasing means.

4. A system for governing the speed of a helicopter propeller with variable pitch blades having output means for controlling the collective pitch of the blades, servo means providing an output depending on the difference between the speed of the propeller and a settable speed reference, and prime mover operatively connected to the propeller having a fuel intake valve differentially responsive to the outputs of the collective pitch means and the servo means; including means for monitoring the prime mover to provide failsafe operation of the system and prevent the propeller from overspeeding including a mechanical differential having an output gear and two input gears, a connection between the output gear and the fuel intake valve with a restraining spring for normally nulling the output of the monitoring differential, means connecting one of the differential input gears for rotation in failsafe condition depending on the speed of the propeller, a flywheel and a centrifugal brake shoe element driven by the other differential input gear in accordance with the speed of rotation of the one of the differential gear inputs, and a brake drum element cooperating with the shoe element at a predetermined propeller speed limit to overcome the restraint of the spring.

5. In a system for monitoring the operation of a prime mover with an output shaft and a fuel intake valve, means for operating the valve to provide failsafe operation of the system and prevent the shaft from overspeeding including a differential having an output connected to operate the valve and two inputs, resilient means for normally biasing the output of the differential to null, means connecting one of the inputs of the differential for rotation in failsafe condition depending on the speed of the shaft, and means for overcoming the restraint of the biasing means including an inertial member driven by the other differential input part in accordance with the speed of rotation of the one of the differential inputs having brake drum and centrifugal brake shoe elements cooperating at a predetermined shaft speed limit.

6. In a system for monitoring the operation of a prime mover with an output shaft and a fuel intake valve, means for operating the valve to provide failsafe operation of the system and prevent the shaft from overspeeding including a mechanical differential having an output gear and two input gears, a connection between the output gear and valve with a restraining spring for normally nulling the output of the differential, means connecting one of the differential input gears for rotation in failsafe condition depending on the speed of the shaft, and means for overcoming the restraint of the spring on the output gear connection including an inertial member driven by the other differential input gear in accordance with the speed of rotation of the one of the differential gear inputs having brake drum and centrifugal brake shoe elements cooperating at a predetermined shaft speed limit.

7. In a system for monitoring the operation of a prime mover with an output shaft and a fuel intake valve, means for operating the valve to provide failsafe operation of the system and prevent the shaft from overspeeding including a differential having an output connected to operate the valve and two inputs, resilient means for normally biasing the output of the differential to null, means connecting one of the inputs of the differential for rotation in failsafe condition depending on the speed of the shaft, a flywheel and a centrifugal brake shoe element driven by the other differential input part in accordance with the speed of rotation of the one of the differential inputs and a brake drum element cooperating with the shoe element at a predetermined shaft speed limit to overcome the restraint of the biasing means.

8. In a system for monitoring the operation of a prime mover with an output shaft and a fuel intake valve, means for operating the valve to provide failsafe operation of the system and prevent the shaft from overspeeding including a mechanical differential having an output gear and two input gears, a connection between the output gear and the valve with a restraining spring for normally nulling the output of the differential, means connecting one of the differential input gears for rotation in failsafe condition depending on the speed of the shaft, a flywheel and a centrifugal brake shoe element driven by the other differential input gear in accordance with the speed of rotation of the one of the differential gear inputs, and a brake drum element cooperating with the shoe element at a predetermined shaft speed limit to overcome the restraint of the spring.

No references cited.